United States Patent
Bearden et al.

(10) Patent No.: US 7,313,098 B2
(45) Date of Patent: Dec. 25, 2007

(54) COMMUNICATION SYSTEM ENDPOINT DEVICE WITH INTEGRATED CALL SYNTHESIS CAPABILITY

(75) Inventors: Mark J. Bearden, Woodstock, GA (US); Scott Vincent Bianco, Suffern, NY (US); Lorraine Denby, Berkeley Heights, NJ (US); Bengi Karacali, Basking Ridge, NJ (US); Jean Meloche, Madison, NJ (US); David Thomas Stott, Basking Ridge, NJ (US); Shane M. Sullivan, Plano, TX (US)

(73) Assignee: Avaya Technology Corp., Basking Ridge, NJ (US)

( * ) Notice: Subject to any disclaimer, the term of this patent is extended or adjusted under 35 U.S.C. 154(b) by 1123 days.

(21) Appl. No.: 10/261,431

(22) Filed: Sep. 30, 2002

(65) Prior Publication Data

US 2004/0062204 A1    Apr. 1, 2004

(51) Int. Cl.
   *H04J 1/16*        (2006.01)
   *G06F 15/16*       (2006.01)
(52) U.S. Cl. .................. 370/252; 370/465; 709/220; 709/227
(58) Field of Classification Search .................. None
   See application file for complete search history.

(56) References Cited

U.S. PATENT DOCUMENTS 6,850,525 B2 * 2/2005 Mitsumori et al. .... 370/395.52
6,947,417 B2 * 9/2005 Laursen et al. ............. 370/389
6,967,958 B2 * 11/2005 Ono et al. ................... 370/401

OTHER PUBLICATIONS

"Omegon Unveils NetAlly Solution; Industry-First Fully Active Service Quality Assurance Platform Assures Customers Unprecedented Levels of Network Availablility and Reliability," http://www.itsecurity.com/tecsnews/sep2000/sep517.htm, pp. 1-3, Sep. 2000.

"Chariot VoIP Assessor Version 1.0," http://www.tmcnet.com/it/0302/0302labs5.htm, pp. 1-4, Mar. 2002.

(Continued)

*Primary Examiner*—Andrew C. Lee
(74) *Attorney, Agent, or Firm*—Ryan, Mason & Lewis, LLP (57) ABSTRACT

Techniques are disclosed for improved monitoring and analysis of VoIP communications, multimedia communications or other types of network traffic in a network-based communication system. In accordance with one aspect of the invention, an endpoint device of the system includes an integrated call synthesis capability. More particularly, the endpoint device is configurable into at least a first mode of operation in which the device responds to one or more commands from a testing server of the system directing the device to participate in a synthetic call or other test communication within the system, and a second mode of operation in which the device is utilizable by a system user to establish an actual communication. Other aspects of the invention relating to kernel timestamping and timestamp post-processing provide improved accuracy for measurements such as jitter, loss and delay.

24 Claims, 3 Drawing Sheets

OTHER PUBLICATIONS

"VoIP Management and Network Testing," http://www.netiq.com/solutions/voip/default.asp, pp. 1-3, 2002.

"Chariot," http://www.netiq.com/products/chr/, pp. 1-2, 2002.

"VoIP Test Module for Chariot," http://ww.netiq.com/products/chr/voipmodule.asp, pp. 1-2, 2002.

Telchemy, Inc., "Monitoring Voice Quality in Voice Over IP Networks," 3 pages, 2001.

Telchemy, Inc., "Bringing Intelligence to Networks," http://www.telchemy.com/, pp. 1-5, 2001.

Viola Networks, "NetAlly® VoIP—VoIP Readiness Testing and Deployment," http://www.omegon.com/netally_voip.asp, pp. 1-4, 2002.

Moshe Sidi et al., "Converged Network Performance Verification and e-Support Using NetAlly®," Omegon Networks Ltd., pp. 1-13, Jun. 2001.

Moshe Sidi, "Reality-based VoIP Readiness Testing using NetAlly® VoIP," Viola Networks, pp. 1-10, Apr. 2002.

Moshe Sidi, "Readying Your Network for VoIP: Get it Right the First Time," Viola Networks, pp. 1-9, Apr. 2002.

* cited by examiner

COMMUNICATION SYSTEM ENDPOINT DEVICE WITH INTEGRATED CALL SYNTHESIS CAPABILITY

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to network analysis and monitoring systems, and more particularly to techniques for the monitoring and analysis of Voice over Internet Protocol (VoIP) communications, multimedia communications or other network traffic in a network-based communication system.

BACKGROUND OF THE INVENTION

A number of software-based systems are known in the art for the monitoring and analysis of VoIP networks. These include, by way of example, Chariot™ VoIP Assessor Version 1.0, commercially available from NetIQ Corporation of San Jose, Calif., and NetAlly™ VoIP, commercially available from Viola Networks of Somerset, N.J., formerly Omegon Ltd. Such systems typically monitor and analyze network-level VoIP performance in terms of quality of service (QoS) or compliance with service level agreements (SLAs), using packet-based measurements such as jitter, loss and delay.

Known systems of the type described above generally make use of so-called "synthetic" IP telephones, as opposed to actual IP telephones. A synthetic IP telephone is a software agent that generates VoIP call traffic. Unfortunately, there are a number of significant disadvantages associated with the use of synthetic IP telephones in a VoIP monitoring and analysis system. For example, a given synthetic IP telephone may require a separate installation of computer hardware and software proximate to one or more actual IP telephones and programmed to predict the QoS of the actual IP telephones. In addition, synthetic IP phones merely simulate hardware and software elements of an actual IP telephone, such as network interfaces, codecs, and jitter buffers, and as a result can introduce errors into the system. Synthetic IP telephones are generally configured to run on general-purpose computing platforms, such as personal computers (PCs), and are generally not designed to run on a telephony platform such as a private branch exchange (PBX), enterprise switch or other communication system switch.

Another significant problem with conventional monitoring and analysis systems is that they are often configured such that application-related effects can lead to mischaracterization of the actual contribution of the network to a given measurement. For example, the actual transmit time for sending out test traffic over the network in the conventional systems may be significantly delayed relative to its recorded transmit time if the device on which the synthetic IP telephone is implemented becomes busy with other processing tasks, thereby rendering the resulting measurements inaccurate.

Yet another problem relates to clock synchronization. Conventional techniques typically utilize a clock synchronization approach, in which the system attempts to synchronize the clocks of the devices on which the synthetic IP telephones are implemented, prior to taking any measurements involving those devices. Unfortunately, this approach is problematic in that clock synchronization takes an excessive amount of time, and thus unduly limits the responsiveness of the system to changing network conditions. Moreover, clock synchronization can fail altogether, since it depends on network conditions at the time the synchronization process is carried out, and these conditions may be unfavorable to accurate synchronization. Poor network conditions in a given segment of the network can preclude accurate synchronization of the associated devices, and as a result the system may be unable to analyze this network segment.

Other known network monitoring and analysis systems utilize a so-called "passive" approach which involves monitoring actual random call traffic over the network. This approach has very limited flexibility, in that it relies on actual call traffic generated by actual users rather than targeted traffic generated in accordance with specified test parameters.

As is apparent from the foregoing, conventional systems suffer from a number of significant problems, and may fail to provide optimal accuracy for measures such as jitter, loss and delay. A need therefore exists for improved techniques for monitoring and analysis of VoIP communications and other types of traffic in network-based systems.

SUMMARY OF THE INVENTION

The invention provides techniques for improved monitoring and analysis of VoIP communications, multimedia communications or other types of network traffic in a network-based communication system.

In accordance with one aspect of the invention, an endpoint device of the system includes an integrated call synthesis capability. More particularly, the endpoint device is configurable into at least a first mode of operation in which the device responds to one or more commands from a testing server of the system directing the device to participate in a synthetic call or other test communication within the system, and a second mode of operation in which the device is utilizable by a system user to establish an actual communication.

A given endpoint device in accordance with the invention may be implemented in hardware, in software or in a combination of hardware and software.

In accordance with another aspect of the invention, the testing server is connectable to each of a number of endpoint devices over a network. The testing server transmits one or more commands to each of at least a pair of the endpoint devices directing the pair of devices to participate in a synthetic call or other test communication within the system.

Other aspects of the invention relate to kernel timestamping and timestamp post-processing. For example, with regard to kernel timestamping, each of first and second endpoint devices may be configured to record timestamp information associated with sending and receiving of a test communication at points in time corresponding substantially to times of respective transmission and reception of the test communication over a connection associated with a network of the system, under the control of an operating system kernel. The timestamp information collected for a given call or other test communication may be subject to a post-processing operation which determines an appropriate separation of a round trip time measurement into a pair of one-way measurements without requiring synchronization of clocks associated with the first and second endpoint devices.

Advantageously, the invention allows particularly accurate measurements of jitter, loss, delay and other QoS-related statistics to be determined using actual telephony endpoint devices, and thus in a manner which provides improved performance relative to the conventional synthetic IP telephone approaches described previously.

Moreover, because the endpoint devices can be configured under the control of the testing server, the invention provides improved results relative to "passive" approaches which simply monitor actual random call traffic.

Another advantage is that the invention improves the flexibility and responsiveness of a network analysis and monitoring system, by allowing accurate measurements to be made on network segments that would not otherwise be readily measurable, while also overcoming the above-described problems associated with application-related effects and clock synchronization.

DETAILED DESCRIPTION OF THE INVENTION

The invention will be illustrated below in conjunction with an exemplary communication system suitable for supporting Internet telephony applications. It should be understood, however, that the invention is not limited to use with any particular type of communication system or configuration of endpoints, servers or other system elements. Those skilled in the art will recognize that the disclosed techniques may be used in any communication application in which it is desirable to provide improved monitoring and analysis of Internet protocol (IP) communications or other types of network traffic in a network-based communication system.

Moreover, the invention, although particularly well-suited for use in monitoring and analysis of VoIP traffic, also provides significant advantages in multimedia traffic applications or other flow-based real-time applications in which it is desirable to understand end-to-end behavior attributable to a network.

The invention can thus be used with voice, video, multimedia or any other type of network traffic.

The term "packet" as used herein is intended to include not only IP packets but also other types of packets used in other packet-based communication systems.

The term "voice" is used herein is intended to include speech and other human-generated audio information, machine-generated audio information or combinations of these and other types of audio information. It should be noted that the invention is generally applicable to any type of audio information. The invention can also be applied to other types of signals, including facsimile signals, signaling tones, etc. As noted above, the invention can also be applied to multimedia traffic, as well as any other type of network traffic in a network-based system.

The term "call" as used herein is intended to be construed broadly so as to encompass Internet telephony communications, VoIP communications, Session Initiation Protocol (SIP) communications, multimedia communications, or other types of network traffic in a network-based communication system.

The terms "endpoint" and "endpoint device" as used herein are intended to include an origination or destination device associated with a given VoIP call or other type of call in a network-based communication system.

A given endpoint device may be implemented in hardware, software or in a combination of hardware and software.

Figure 1:
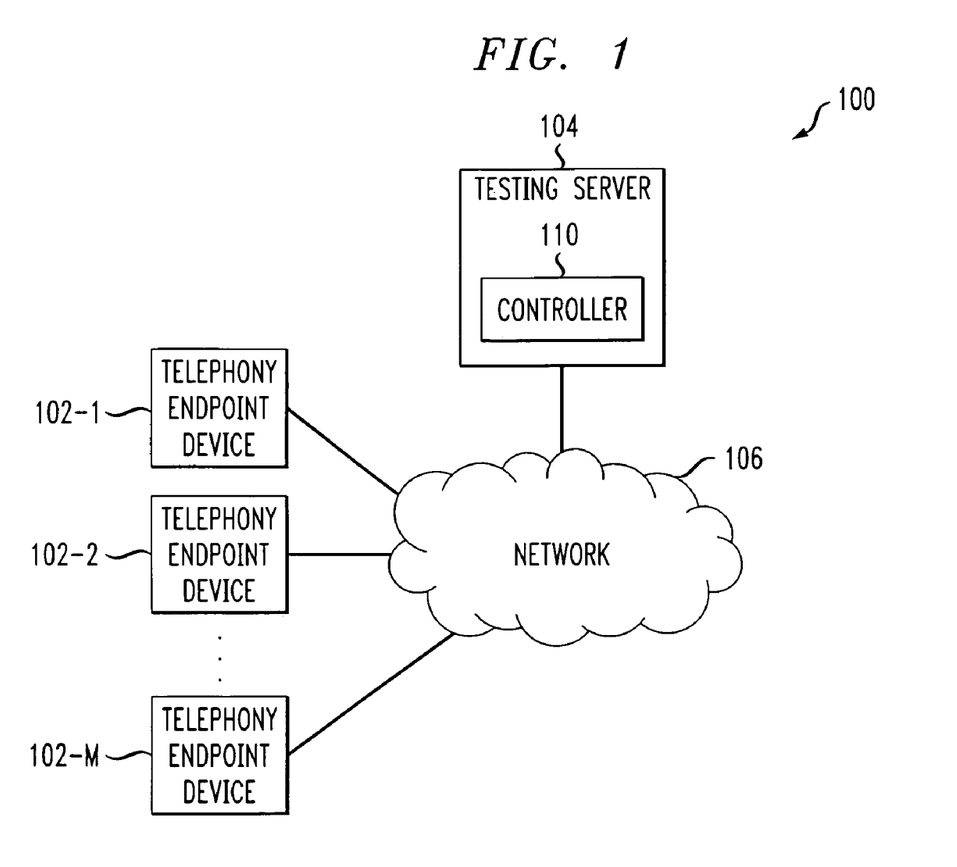
FIG. 1 shows an exemplary communication system in which the invention is implemented.

FIG. 1 shows an example Internet telephony system 100 in which the present invention is implemented. The system 100 includes a number of telephony endpoint devices 102-i, i=1, 2, ... M and a testing server 104, each coupled to a network 106. The testing server 104 includes a software component 110, illustratively referred to herein as a "controller," which controls at least a subset of the telephony endpoint devices 102 to provide VoIP monitoring and analysis in the system 100 using the techniques of the invention.

In accordance with one aspect of the invention, the telephony endpoint devices 102 may be otherwise conventional wired or wireless IP telephones, personal digital assistants (PDAs), mobile telephones, personal computers (PCs), single-board computers (SBCs) or other types of processing devices, configured to include a server-controllable integrated call synthesis capability in accordance with the invention.

At least a subset of the telephony endpoint devices 102 comprise actual rather than synthetic VoIP communication devices. These devices are configurable into at least a test mode of operation and a normal mode of operation. The invention can be implemented, however, in an embodiment in which one or more of the endpoint devices are not utilizable for actual communications.

In the test mode of operation, the devices respond to commands from the testing server 104 to participate in test calls for the purpose of VoIP monitoring and analysis in system 100, utilizing their integrated call synthesis capability. For example, under control of the testing server 104, a given one of the telephony endpoint devices 102 may synthesize a call, measure QoS parameters such as jitter, loss and delay associated with the call, and report the results back to the testing server 104.

In the normal mode of operation, the devices may be utilized by system users to conduct actual endpoint-to-endpoint VoIP communications in a conventional manner. Conventional aspects of such telephony endpoint devices are well-known in the art and therefore not described in further detail herein.

It should be noted that the telephony endpoint devices 102 are each typically configured to operate as both receiver and transmitter, as in the case of a bidirectional VoIP communication established between a given pair of endpoints.

Additional system elements, not shown in the figure, may be coupled between each of the endpoints 102 and the network 106 or testing server 104.

The testing server 104 may be implemented as part of or in conjunction with an otherwise conventional VoIP analysis tool or other network management system application that is used, for example, to test, diagnose, troubleshoot or design an IP telephony system. An example of a network management system application is the VMON® system from Avaya Inc. of Basking Ridge, N.J., USA.

The testing server 104 may be implemented as a single server, as a set of servers, or in other suitable configurations. For example, the testing server may have a distributed architecture, in which it is distributed across multiple machines. The controller 110 of server 104 may be distributed in a similar manner.

It should also be noted that, although only a single testing server is shown in the system 100 of FIG. 1, other embodiments of the invention may include multiple testing servers, each operating substantially in the manner described herein, so as to provide improved communication and collection of measurement data relative to that achievable using a single testing server.

Moreover, although controller 110 is referred to above as being implemented in software, this is by way of example only, and in other embodiments of the invention the controller 110 may be implemented in other ways, e.g., as a combination of hardware and software.

Network 106 may represent, e.g., a global communication network such as the Internet, a wide area network, a metropolitan area network, a local area network, a wireless cellular network, a public switched telephone network (PSTN), or a satellite network, as well as portions or combinations of these or other communication networks.

The network 106 may comprise conventional IP routers, gateways, switches or other packet processing elements, configured to provide at least a portion of the VoIP processing operations described herein. For example, the network may include a DEFINITY® Enterprise Communication Service (ECS) communication system switch available from Avaya Inc. Another example switch suitable for use in conjunction with the present invention is the MultiVantage™ communication system switch, also available from Avaya Inc.

Other standard protocols that are commonly utilized in VoIP communications include User Datagram Protocol (UDP), described in Internet Engineering Task Force (IETF) Request for Comments (RFC) 768, "User Datagram Protocol," August 1980, http://www.ietf.org/rfc/rfc768.txt, Real-Time Transport Protocol (RTP), described in IETF RFC 1889, "RTP: A Transport Protocol for Real-Time Applications," http://www.ietf.org/rfc/rfc1889.txt, and RTP Control Protocol (RTCP), described in IETF RFC 3158, "RTP Testing Strategies," August 2001, all of which are hereby incorporated by reference herein. By way of example, VoIP communications may comprise RTP voice data packets that are sent over an IP network using UDP. More particularly, the RTP packets are encapsulated in UDP packets which are themselves encapsulated in IP packets.

Signaling protocols utilizable in conjunction with VoIP communications to provide functions such as call setup, teardown and dial tone include Session Initiation Protocol (SIP), described in IETF RFC 3261, "SIP: Session Initiation Protocol," June 2002, http://www.ietf.org/rfc/rfc3261.txt, International Telecommunication Union-Telecommunication Standardization Sector (ITU-T) Recommendation H.323, "Packet-based multimedia communication systems," November 2000, and ITU-T Recommendation H.225, "Call signaling protocols and media stream packetization for packet-based multimedia communication systems," November 2000, all of which are incorporated by reference herein.

VoIP communications in the context of the present invention may be implemented utilizing one or more of the above-cited protocols, or other suitable protocols, as will be readily apparent to those skilled in the art.

It should be emphasized that the simplified configuration of the system 100 as shown in FIG. 1 is for purposes of illustration only, and should not be construed as limiting the invention to any particular arrangement of elements. For example, the system 100 may include additional endpoints, and may utilize other types and arrangements of routing elements, switching elements or other types of processing elements.

Figure 2:
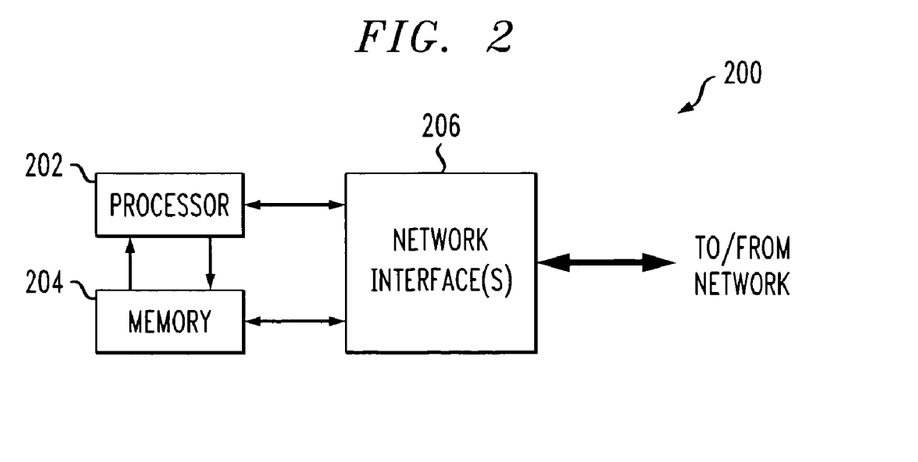
FIG. 2 is a simplified block diagram showing one possible implementation of a processing element of the FIG. 1 system.

FIG. 2 shows one possible implementation of a given processing element 200 of the FIG. 1 system. The processing element 200 may represent at least a portion of one of the telephony endpoint devices 102 or the testing server 104, and includes a processor 202 coupled to a memory 204 and one or more network interfaces 206. The VoIP monitoring and analysis techniques of the present invention may be implemented at least in part in the form of software storable in the memory 204 and executable by the processor 202. The memory 204 may represent random access memory (RAM), read-only memory (ROM), optical or magnetic disk-based storage, or other storage elements, as well as combinations thereof.

Those skilled in the art will recognize that the individual elements of FIG. 2 as shown for illustrative purposes may be combined into or distributed across one or more processing devices, e.g., a microprocessor, an application-specific integrated circuit (ASIC), a computer or other device(s).

The FIG. 2 arrangement is considerably simplified for purposes of illustration. If viewed as representative of one of the telephony endpoint device 102, the processing element 200 may include conventional elements typically associated with such a device, such as codecs and other voice signal processing hardware and software. Similarly, if viewed as representative of the testing server 104, the processing element 200 may include conventional elements typically associated with a server, such as disk-based storage.

Figure 3:
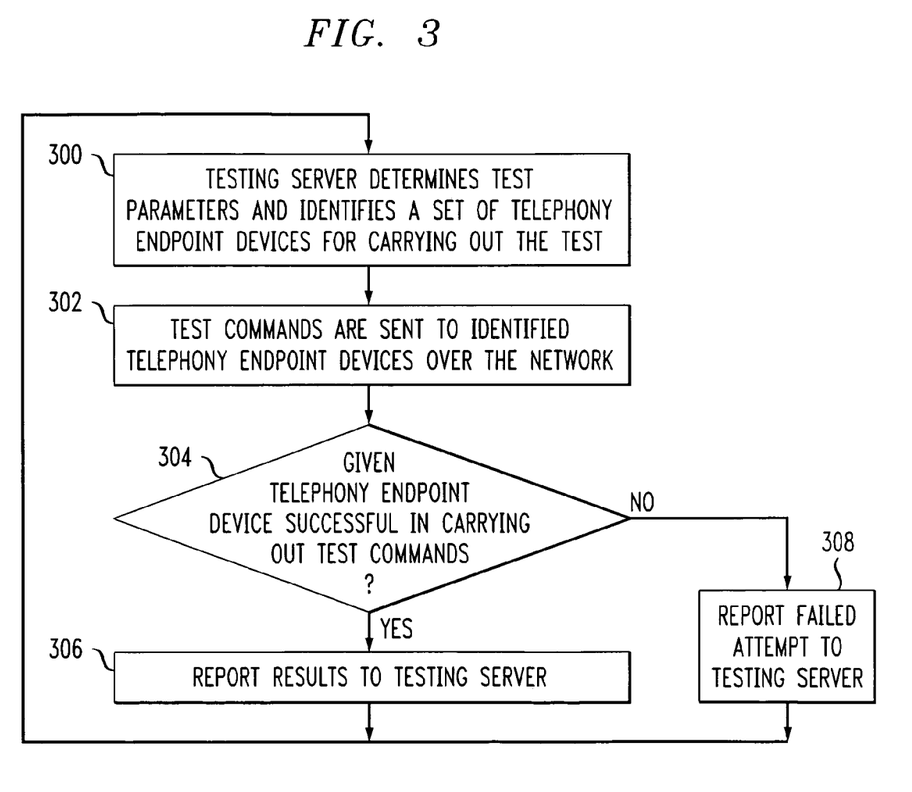
FIG. 3 is a flow diagram illustrating an illustrative network monitoring and analysis process implementable in the communication system of FIG. 1 using the techniques of the invention.

FIG. 3 is a flow diagram of an example process in accordance with the invention for performing VoIP monitoring and analysis in the system 100 using the testing server 104 and the telephony endpoint devices 102. The process as shown includes steps 300, 302, 304, 306 and 308. As noted above, each of at least a subset of the telephony endpoint devices 102 is capable of accepting one or more commands from the telephony server 104 over the network 106 which direct the device as to when to synthesize a call, but otherwise operates as a normal telephony endpoint device utilizable by a system user for placing an actual call.

In general, the call synthesis and reporting features of the test mode of operation preferably will not prevent the user from activating the telephony endpoint device and placing an actual call whenever desired. Although it is possible to provide a "test in progress" indicator to the user via the telephony endpoint device, so as to discourage the user from interrupting the test with an actual call, a preferable approach in many applications will be simply to terminate the synthetic call and the associated portion of the test whenever the user places an actual call. In other words, the telephony endpoint device can be configured to automatically exit the test mode and return to the normal mode whenever a user goes off-hook at that device to place an actual call. The telephony server at this point can find one or more other telephony endpoint devices in the system 100 that are available for use in placing synthetic calls for monitoring and analysis purposes.

Referring now to step 300 of FIG. 3, the telephony server 104 determines test parameters and identifies a set of telephony endpoint devices 102 for carrying out the test. For example, the telephony server may determine desirable times, durations, and codec settings for the test, as well as the particular devices that will place synthetic calls as part of the test. The particular devices may be selected so as to meet specified reporting or analysis functions established by an otherwise conventional VoIP analysis tool or other network management application.

In step 302, test commands are sent to the identified endpoint devices 102 over the network 106. For example, for each of the devices 102 selected to be part of a synthetic call, a set of commands may be sent directing the device to place or accept a particular synthetic call at a certain time using certain parameters, and to report the results back to the testing server.

In step 304, upon receiving one or more test commands, a given telephony endpoint device attempts to carry out the commands, and determines if the commands were carried out successfully. If successful, the device reports this result and any obtained QoS measurements to the testing server in step 306.

If the telephony endpoint device is unable to carry out the requested test, for example, because the user placed an actual phone call at the same time the test was requested and the device was not able to support both functions, then the device reports a failed test attempt to the test server, if it is able to do so, in step 308. If the device is for some reason unable to report a test failure to the test server, then the test server records the fact that some exceptional situation prevented carrying out the test.

When attempting to carry out a command to generate a synthetic call, the telephony endpoint device typically performs a call setup process to set up the call with a specified destination device, and then begins to send RTP packets with a predetermined payload. The call may involve an IP telephony gateway, call controller or other switch within or otherwise associated with the network. The predetermined payload may be randomly generated, derived from an actual voice recording, or otherwise configured to be suitably representative of actual voice data. During the call, QoS measurements are collected for the call traffic. The measurement collection may be performed in compliance with RTCP. At the end of the call, or at intervals during the call, the measurements may be reported over the network to the test server.

Advantageously, the present invention in the illustrative embodiment described above allows particularly accurate measurements of jitter, loss, delay and other QoS-related statistics to be determined using actual telephony endpoint devices, and thus in a manner which provides improved performance relative to the conventional synthetic IP telephone approaches described previously. Moreover, because the endpoint devices can be configured under the control of the testing server, the invention provides improved results relative to "passive" approaches which simply monitor actual random call traffic. The invention also provides other advantages in terms of improved flexibility and responsiveness of a network analysis and monitoring system, by allowing accurate measurements to be made on network segments that would not otherwise be readily measurable.

The manner in which the present invention addresses the previously-described problems associated with application-related effects and clock synchronization will be described in conjunction with the following example.

It should be noted that in the particular example given below, the endpoint devices comprise devices that may be configured so as to be utilizable for actual communications. However, the endpoint devices need not be configured in this manner, and in certain embodiments of the invention may be configured so as to be utilizable for test communications only. Of course, the present invention is not restricted with regard to endpoint processing platform or configuration, and can be implemented on a wide variety of different endpoint devices.

EXAMPLE

As noted above, the telephony endpoint devices may be IP telephones, PDAs, PCs, SBCs or other types of processing devices. An example implementation of the system 100 based on a particular telephony endpoint device will now be described. In this implementation, the endpoint device is used to generate synthetic VoIP communications over the network under the control of the testing server. For this example, the endpoint hardware and software will first be described, followed by the telephony server controller 110.

The endpoint hardware in this example comprises an iPAQ Pocket PC commercially available from Compaq Computer Corporation of Houston, Tex., USA. More particularly, iPAQ models 3150 and 3650 are used. The 3150 has a monochrome display and is equipped with 15 Megabytes (MB) of RAM and 16 MB of Flash ROM. The 3650 has a color display and is equipped with 32 MB of RAM and 16 MB of Flash ROM. The iPAQ was also configured to include a PCMCIA sleeve and a PCMCIA Ethernet adapter comprising a LINKSYS® EtherFast® 10/100 PCMCIA card. During operation, the iPAQ is connected to a 5V power supply with a maximum total output power of 10 Watts.

The endpoint software, which runs on the above-described endpoint hardware, in this example comprises a modified operating system kernel, the remaining operating system environment, and an application program capable of sending and receiving, under the control of the testing server, VoIP communications.

The operating system kernel is a modified version of the ARM branch of the Linux 2.4.18 kernel, that is, the branch of the Linux kernel for ARM processors. The modifications to the operating system are contained in two kernel loadable modules, namely, a "Babel" module and modified versions of the Ethernet drivers pcnet_cs and axnet_cs. The Babel kernel module takes packet departure timestamps and provides access to them through specialized Ethernet ioctl calls, in accordance with the invention. Besides this modified kernel, the endpoint operating system includes a collection of standard Linux system tools such as route, ifconfig, traceroute, grep, etc. The tools are part of the Familiar v0.5.3 Linux distribution, described at http://familiar.handhelds.org, which is incorporated by reference herein.

An operating endpoint device accepts Transmission Control Protocol (TCP) connections on the following ports:

| | |
|---|---|
| 22 | ssh |
| 6000 | x11 |
| 9767 | Babel |

The ssh and x11 notations in the listing above refer to secure login shells and windowing, respectively. Port 9767 is selected arbitrarily from a range of port numbers which are not otherwise reserved.

The endpoint device can create multiple sub interfaces to the physical interface and use different virtual local area network (VLAN) and layer 2 priority tagging on each of the interfaces concurrently. The assignment of IP addresses on network interfaces can be done manually or using Dynamic Host Configuration Protocol (DHCP), described at http://www.isc.org/products/DHCP, which is incorporated by reference herein. Login access to the endpoint device may be provided using ssh once the endpoint device is assigned an IP address, or through a serial connection using a serial port, USB cradle or similar mechanism. In both cases, the access is protected by password.

Figure 4:
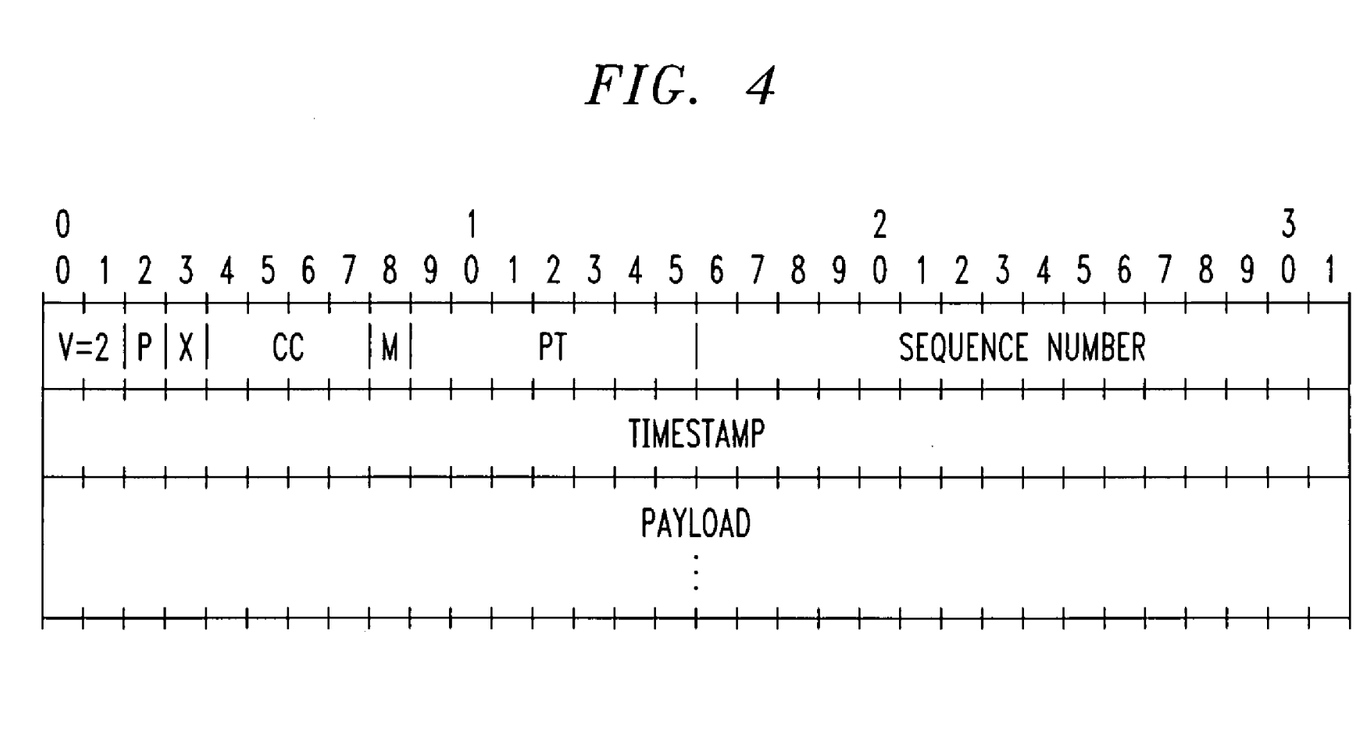
FIG. 4 shows an RTP packet format that is usable in a UDP payload in VoIP communications generated in the FIG. 1 system utilizing the techniques of the invention.

The endpoint device software application program is a C-language application that is capable of receiving and sending RTP streams, that is, paced sequences of UDP packets with RTP payload. The packets are timestamped as they are sent and received. The UDP payload is an RTP packet that is formatted as shown in FIG. 4. The RTP flags and other information in the packet header as shown in FIG. 4 are set as follows:

| version | protocol version | 2 |
|---------|------------------|---|
| p | padding flag | 0 |
| x | header extension flag | 0 |
| cc | CSRC count | 0 |
| m | marker bit | 0 |
| pt | payload type | 0 |
| | | 0 × 80 |

In the above table, 0x80 denotes the values of the first 16 bits of the packet header, in hexadecimal format.

The sequence number starts at a random point and is increased by one with each new packet. The RTP packet payload contains audio data corresponding to the phrase "Hello world!" repeated in a variety of languages.

The endpoint device software receives its instructions from the testing server through a TCP connection. Alternatively, connections established using other protocols, such as UDP, Simple Network Management Protocol (SNMP), etc. may be used.

The basic operation in this example involves the controller, to be described below, and a pair of endpoint devices. The controller asks endpoint device A to send an RTP stream to endpoint device B. The number, frequency and size of the packets is part of the request. The controller asks endpoint device B to echo the RTP stream back to the endpoint device A. Endpoint device A sends the RTP stream and waits for the echo stream to come back. Endpoint device B simply echos all the packets in the stream. Both endpoint devices timestamp when the packets are sent and received, and the timestamps are kept in memory in the endpoint devices. After an appropriate amount of time has elapsed, the controller retrieves the timestamp data from both endpoint devices. The endpoint device can hold timestamp data for up to 60,000 packets on iPAQ model 3150 and twice as much on iPAQ model 3150.

The controller in this example is a program written in the python programming language, described at www.python.org, and running on a server equipped with ExpertNet® software available from Avaya Inc. As described previously, the controller controls a collection of endpoint devices installed throughout a system. The controller discovers the endpoint devices having integrated call synthesis capability by, for example, "sniffing" on the above-noted port 9767 on user-supplied ranges of IP addresses. Once the endpoint devices are discovered, the controller enters a recurrent loop as follows:

1- select two endpoint devices (A and B) from the pool of discovered endpoints.
2- Instruct A and B to initiate and echo a call.
3- Wait for the time necessary for the call to complete.
4- Collect timestamp data from A and B.
5- Wait for the time of a rest period.
6- Return to step 1.

The controller controls the amount of traffic injected in various ways, using the following five parameters:

a- The size of the packets in the stream.
b- The frequency with which the packets are sent.
c- The length of synthetic calls.
d- The amount of time between calls.
e- The number of concurrent calls.

Parameters a and b may be used to emulate various codecs. For example, to emulate an ITU-T G.711 codec, the controller uses a=400 bytes and b=50 ms, which amounts to 8 kilobytes or 64 kilobits in one second.

Parameters b and c are used to determine the number of packets that are to be exchanged by the endpoint devices. For example, with b=50 ms and c=1 s, the endpoint devices will exchange 20 packets, resulting in 40 UDP packets in total (20 from A to B and 20 from B to A).

Parameters d and e are used to control the overall intensity of the traffic injection process. For example, with a=400 bytes, b=50 ms, c=1 s, d=2 s, and e=1, the controller is injecting a total of 16 kilobytes every 3 seconds or 5.3 kilobytes per second in total bidirectional traffic. Typical values for an ITU-T G.711 codec are a=400 bytes, b=50 ms, c=1 s, d=1 s, and e=1, resulting in 5.3 kilobytes per second in traffic being generated by the endpoint device, and for an ITU-T G.729 codec are a=50 bytes, b=50 ms, c=1 s, d=1 s, and e=1, resulting in 0.6 kilobytes per second in traffic being generated by the endpoint device.

The manner in which the above-described controller overcomes the previously-described problems of application-related effects and clock synchronization will now be described in greater detail. More particularly, the present invention addresses and solves these problems through the use of kernel timestamping and timestamp post-processing.

The kernel timestamping approach of the present invention will be described first, followed by timestamp postprocessing.

Consider a packet traversing a round trip from endpoint device A to endpoint device B and back to endpoint device A. An application desiring to measure the time spent by the packet in transit, that is, the sum of time spent between A and B and between B and A, could perform the following operations:

| ON A | ON B |
|------|------|
| Baddress='1.1.1.3';<br>packet='some packet content';<br>time0=gettimeofday( );<br>send(Baddress,packet);<br>receive(Baddress,reply);<br>time1=gettimeofday( ); | Aaddress='1.1.1.2';<br>receive(Aaddress,packet);<br>send(Aaddress,packet); |

The application could then compute the round trip transit time as time1−time0. However, this approach is unduly simplistic for a number of reasons.

First, the processing time on B, that is, the time needed to receive and send the packet, is being attributed to the round trip transit time. This is inappropriate since the goal is typically to measure the time spent on the network.

Second, when an application makes a send system call, the destination address and the packet are handed over to the operating system which will, in time, make sure the packet is sent. But there could be a substantial gap between the time at which the application asks for a packet to be sent and the time at which the operating system actually puts the packet "on the wire," that is, actually transmits the packet over a connection associated with the network. The sequence of events is as follows:

T1: Application makes send system call
T2: Operating system takes note of request
T3: Operating system puts packet on the wire In typical network monitoring and analysis applications, it is not unusual for the time period T3-T1 to exceed 20 to 30 milliseconds or more. The duration of the T3-T1 period will depend on how busy the operating system is doing other things, and is thus impacted by application-related effects such as execution of a screen saver, a word-processing application, a printer call, or a competing concurrent call.

Third, when an application makes a receive system call, the packet was typically received by the operating system at some prior point in time and the operating system incurs some delay before it decides to hand over the packet to the application. When an application makes a receive system call, it goes into a "sleep" mode and counts on the operating system to awaken it when a packet becomes available. However, there could be a substantial gap between the time at which the application receives the packet and the time at which the operating system has received the packet. The sequence of events is as follows:

T4: Operating system receives packet
T5: Operating system posts packet on application queue
T6: Operating system awakens the sleeping application It is not unusual for the time period T6-T4 to exceed 20 to 30 milliseconds or more, again depending on how busy the operating system is doing other things. Moreover, the duration time period T6-T4 is susceptible to the application-related effects noted previously.

The present invention addresses the timing problems described above through the use of an approach referred to herein as kernel timestamping, where "kernel" denotes the previously-mentioned modified operating system kernel. More specifically, in accordance with the present invention, the time0 variable in the present example is loaded within the operating system as the last step before putting the packet on the wire and the time1 variable is loaded within the operating system as soon as a packet is read on the wire. As a result, the round trip transit time will not include the undesirable variable time periods T3-T1 or T6-T4, and the accuracy of the measurement is considerably improved.

In this example, the Babel module described above is configured to collect kernel timestamps by inserting a call to a function babel_kts within the operating system kernel at the appropriate time for departing packets. For example, the babel_kts function call may be placed in the above-noted axnet_cs driver for the iPAQ endpoint equipped with a LINKSYS® EtherFast® 10/100 PCMCIA card. As another example, the babel_kts function call may be placed in the e100net.c network driver ethernet.c, version 1.21 for the ETRAX™ 100LX network controller, available from Axis Communications AB. For arriving packets, the SIOCG-STAMP ioctl system call, a facility available on recent Linux kernels, may be used.

It is preferable to place the kernel timestamp function call babel_kts within the driver code at a point immediately prior to the triggering of a Direct Memory Access (DMA) transfer from the operating system to the Ethernet hardware. This point will generally vary depending upon the particular driver used, but can be readily determined in a straightforward manner by those skilled in the art given the teachings provided herein.

Appendix 1 includes an example set of code for the Babel module referred to above. It should be emphasized that this code is provided by way of illustrative example only. The invention does not require the particular processing functions embodied in this code. A corresponding set of pseudocode for the Appendix 1 code is shown in Appendix 2, and again is provided by way of illustrative example only.

The above-noted timestamp post-processing technique will now be described. Round trip time measurements can be made using a single clock, and thus clock synchronization is not an issue for those measurements. However, measuring one-way delays utilizing conventional techniques would generally require that the clocks associated with the endpoint devices A and B in the present example be synchronized. As noted previously, conventional techniques generally apply a synchronization approach which attempts to synchronize the endpoint device clocks prior to packet transmission. This is problematic in that it requires an excessive amount of time, thereby limiting the ability of the monitoring and analysis system to respond to changing network conditions, and is also susceptible to failure.

The measurement of one-way delays can be viewed as partitioning the round trip time into a pair of one-way delays. In other words, the round trip time $R_{ABA}$ is the sum of the one-way delay $D_{AB}$ from A to B and the one-way delay $D_{BA}$ from B to A:

$$R_{ABA} = D_{AB} + D_{BA}.$$

The timestamp post-processing approach of the present invention performs this partitioning after placement of the test calls, rather than before as in conventional techniques. More particularly, this approach collects timestamp data for round trip time measurements for each packet within a given call, divides the round trip time by two, and uses the "record" time for the given call, that is, the fastest of all of the times determined for the packets of the given call, to synchronize the measurements for all packets within the given call. When no adequate record time is observed, the system may revert to formerly obtained record times, making a linear adjustment for natural clock drift.

A significant advantage of the timestamp post-processing approach of the present invention is that a given test call can be set up and started much more quickly than in the conventional approaches which require clock synchronization. This is particularly important for a monitoring and analysis system that tries to locate the source of networking problems which may only exist for a short length of time.

The kernel timestamping and timestamp post-processing techniques of the present invention are particularly well-suited for use with any operating system which permits modification of the portion of the kernel that moves packets to or receives packets from a network interface, and which has access to reading a sufficiently fine-grained system clock.

It is to be appreciated that the foregoing example is merely illustrative of one possible embodiment of the invention, and should not be construed as limiting the scope of the invention in any way.

As previously noted, one or more of the call processing functions described above in conjunction with the illustrative embodiments of the invention may be implemented in whole or in part in software utilizing processor 202 and memory 204. Other suitable arrangements of hardware, software or both may be used to implement the call processing functions of the invention.

It should again be emphasized the above-described embodiments are illustrative only. For example, alternative embodiments may utilize different endpoint device and testing server hardware and software configurations, different data formats for synthesized calls, different types of network traffic, and different communication protocols than those of the illustrative embodiments. In addition, although the above example utilizes a Linux operating system, the invention can be implemented using any operating system. Furthermore, although test communications between a selected pair of endpoints are shown in conjunction with the above example, other arrangements are possible, such as communications between a given originating endpoint and multiple destination endpoints, etc. These and numerous other alternative embodiments within the scope of the following claims will be apparent to those skilled in the art.

APPENDIX 1

```
//
// INSERT THE FOLLOWING IN THE IOCTL HANDLER
//
// look for SIOCDEVPRIVATE
// case SIOCDEVPRIVATE+SIOCDEVPRIVATEOFFSET:
// return babel_ioctl(rq);
//
// INSERT THE FOLLOWING IN THE SEND PACKET HANDLER
//
// look for trans_start
// babel_kts(skb);
//
#include <linux/module.h>
#include <linux/skbuff.h>
#include <linux/if.h>
#include <linux/if_ether.h>
#include <linux/in.h>
#include <linux/ip.h>
#include <linux/udp.h>
#include <linux/tcp.h>
#include <asm/uaccess.h>
#include "babel.h"
#define BABELDEBUG 0
static int babel_debug = BABELDEBUG;
#define BABEL_TS_ANCIENT 5000000
static int ts_ancient = BABEL_TS_ANCIENT;
#define MAX_BABEL_TS_NUM 32
static int max_ts_num = MAX_BABEL_TS_NUM;
#define BABEL_VERSION_MAJOR 0
#define BABEL_VERSION_MINOR 9
typedef struct {
int status;
unsigned int saddr;
unsigned int daddr;
unsigned int sport;
unsigned int dport;
unsigned int i;
struct timeval ts;
} ts_list_t;
static ts_list_t *ts_list;
static spinlock_t babel_lock;
int init_module(void)
{
ts_list=(ts_list_t *)kmalloc(max_ts_num*sizeof(ts_list_t),GFP_KERNEL);
memset(ts_list, 0, max_ts_num*sizeof(ts_list_t));
spin_lock_init(babel_lock);
printk("Babel version %d.%d (c) Avaya Inc\n",BABEL_VERSION_MAJOR,BABEL_VERSION_MINOR);
return 0;
}
#ifdef MODULE
MODULE_DESCRIPTION("Babel support");
MODULE_PARM(babel_debug,"i");
MODULE_PARM_DESC (babel_debug, "The debugging level (default 0)");
MODULE_PARM(ts_ancient,"i");
MODULE_PARM_DESC (ts_ancient, "What is considered ancient in microseconds (as in stale)
(default 5000000)");
MODULE_PARM(max_ts_num,"i");
MODULE_PARM_DESC (max_ts_num, "The maximum number of slots--concurrent calls (default
32)");
EXPORT_SYMBOL(babel_kts);
EXPORT_SYMBOL(babel_ioctl);
void cleanup_module(void)
{
kfree(ts_list);
}
#else
#include <linux/init.h>
#include <linux/config.h>
```

APPENDIX 1-continued

```
#include <linux/module.h>
#include <linux/sched.h>
#include <linux/slab.h>
#include <linux/errno.h>
#include <linux/kernel.h>
#include <linux/fs.h>
#include <linux/string.h>
#include <linux/init.h>
#include <linux/config.h>
#include <asm/system.h>
#include <asm/io.h>
#include <asm/delay.h>
static int__init
babel__init(void)
{
init__module( );
return 0;
}
module__init(babel__init);
#endif
#define offset(x,y) ((int)(&(((struct x*)0)->y)))
#define MUTSDIFF(t1,t0) (((t1)->tv__sec-(t0)->tv__sec)*1000000+((t1)->tv__usec-(t0)->tv__usec))
#define IS__ANCIENT(t1,t0) (MUTSDIFF(t1,t0)>ts__ancient)
#define BABEL__TS__FREE 0
#define BABEL__TS__ROK 1
#define BABEL__TS__WOK 2
static char * hod(int len, char *data) {
static char odstr[2*4096+1];
int i;
memset(odstr,0,2*4096+1);
for(i=0;i<4096 && i<len;i++) {
sprintf(odstr+2*i,"%02x",data[i]);
}
return odstr;
}
void babel__kts(struct sk__buff*skb) {
//
// The following remembers the time at which udp packets are
// sent together with the destination ip, port, the local port usea and the first
// eight bytes of the payload. The time stamps are stored in the array ts__list
// and can be retrieved later with the SIOCDEVPRIVATE ioctl system call. The
// slots in ts__list are identified by the sp:dip:dp combination and a given
// slot is re-used for all packets matching sp:dip:dp. If your application
// wants the timestamps, you better get it BEFORE the driver ships a new
// packet because at that point, the timestamp will be overwritten. As noted
// above the ts__list holds the sp:dip:dp which identifies the udp stream
// and the first eight bytes of the payload which identifies the packet
// within the stream. The application could therefore use a sequence of
// integers (eight bytes) to identify its packets. This identifier is an
// argument to the SIOCDEVPRIVATE ioctl. That way, we are assured that
// the timestamps does match the udp stream and the packet identifier.
//
// If the ioctl is issued before the packet is sent (and therefore before
// the timestamps is known) it returns -EAGAIN. The code below toggles the
// status component of the ts__list structure between BABEL__TS__WOK and BABEL__TS__ROK
// to keep track of whether or not a timestamp is being lost (rewritten
// before the application had a chance to issue a SIOCDEVPRIVATE ioctl).
// An application could delay the sending of packets until it is able to
// retrieve the previous timestamp.
//
// There are MAX__BABEL__TS__NUM (32 right now) elements in the
// ts__list array. That means that the driver can keep track of 32 distinct
// udp streams. That number should not be arbitrarily increased. With every
// packet sent, the code below scans the ts__list for a matching sp:dip:dp
// combination to figure out where the timestamps is to be stored. That
// takes time 32 times 3 comparisons. This is an ethernet driver . . .
// When an array element has aged enough (BABEL__TS__ANCIENT usec = 10 s) it is
// marked as BABEL__TS__FREE and can be reused for a different sp:dip:dp
// combination.
if(skb->nh.iph->protocol==IPPROTO__UDP) {
// 26 saddr
// 30 daddr
// 34 sport
// 36 dport
// 51 data
int i;
static int showoffsets=1;
struct iphdr *iph=(struct iphdr *)(skb->data+sizeof(struct ethhdr));
struct udphdr *udph=(struct udphdr *)(skb->data+sizeof(struct ethhdr)+sizeof(struct iphdr));
```

APPENDIX 1-continued

```
unsigned char *data=(unsigned char  *)(skb->data+sizeof(struct ethhdr)+sizeof(struct
iphdr)+sizeof(struct tcphdr));
// unsigned char *data=(unsigned char *)(skb->data+54);
__u32 saddr=iph->saddr;
__u32 daddr=iph->daddr;
__u16 sport=ntohs(udph->source);
__u16 dport=ntohs(udph->dest);
unsigned int ipack=(*(unsigned int *)data);
if(babel_debug>5 && showoffsets) {
printk(KERN_WARNING "offset of data in sk_buff is %d\n",offset(sk_buff,data));
printk(KERN_WARNING "size of ethhdr is %d\n",sizeof(struct ethhdr));
printk(KERN_WARNING "size of iphdr is %d\n",sizeof(struct iphdr));
printk(KERN_WARNING "size of udphdr is %d\n",sizeof(struct udphdr));
printk(KERN_WARNING "size of tcphdr is %d\n",sizeof(struct tcphdr));
printk(KERN_WARNING "offset of protocol in iphdr is %d\n",offset(iphdr,protocol));
printk(KERN_WARNING "offset of saddr in iphdr is %d\n",offset(iphdr,saddr));
printk(KERN_WARNING "offset of daddr in iphdr is %d\n",offset(iphdr,daddr));
printk(KERN_WARNING "offset of source in udphdr is %d\n",offset(udphdr,source));
printk(KERN_WARNING "offset of dest in udphdr is %d\n",offset(udphdr,dest));
showoffsets=0;
}
if(babel_debug>5) {
printk(KERN_WARNING "sending packet with protocol %d\n",skb->nh.iph->protocol);
printk(KERN_WARNING "packet saddr is -%x-\n",(unsigned int)saddr);
printk(KERN_WARNING "packet daddr is -%x-\n",(unsigned int)daddr);
printk(KERN_WARNING "packet sport is -%x-\n",(unsigned int)sport);
printk(KERN_WARNING "packet dport is -%x-\n",(unsigned int)dport);
printk(KERN_WARNING "packet ipack is -%x-\n",ipack);
if(babel_debug>9) {
printk(KERN_WARNING "packet raw is -%s-\n",hod(64,(char *)skb->data));
printk(KERN_WARNING "packet data is -%s-\n",hod(64,data));
}
}
//
// look for the right slot--it may or may not exist
//
for(i=0;i<MAX_BABEL_TS_NUM;i++) {
if(ts_list[i].daddr==BABEL_TS_FREE) continue;
if(ts_list[i].daddr!=daddr) continue;
if(ts_list[i].sport!=sport) continue;
if(ts_list[i].dport!=dport) continue;
if(ts_list[i].status!=BABEL_TS_WOK) {
printk(KERN_WARNING  "overwriting  for  %03d.%03d.%03d.%03d:%u-
%03d.%03d.%03d.%03d:%u packet %d\n",
((unsigned char *)&saddr)[0],
((unsigned char *)&saddr)[1],
((unsigned char *)&saddr)[2],
((unsigned char *)&saddr)[3],
ntohs(sport),
((unsigned char *)&daddr)[0],
((unsigned char *)&daddr)[1],
((unsigned char *)&daddr)[2],
((unsigned char *)&daddr)[3],
ntohs(dport),
ipack
);
}
if(babel_debug>5)  printk(KERN_WARNING  "writing  for  %03d.%03d.%03d.%03d:%u-
%03d.%03d.%03d.%03d:%u packet %d\n",
((unsigned char *)&saddr)[0],
((unsigned char *)&saddr)[1],
((unsigned char *)&saddr)[2],
((unsigned char *)&saddr)[3],
ntohs(sport),
((unsigned char *)&daddr)[0],
((unsigned char *)&daddr)[1],
((unsigned char *)&daddr)[2],
((unsigned char *)&daddr)[3],
ntohs(dport),
ipack
);
do_gettimeofday(&ts_list[i].ts);
ts_list[i].i=ipack;
ts_list[i].status=BABEL_TS_ROK;
break;
}
}
}
int babel_ioctl(struct ifreq *rq) {
```

APPENDIX 1-continued

```
babel_ioctl_arg_t ioctlarg;
struct timeval tv;
int rc;
int i;
static char buf[1024];
unsigned long flags;
rc=copy_from_user(&ioctlarg, rq->ifr_data, sizeof(ioctlarg));
if(rc<0) {
printk(KERN_WARNING "cannot get ioctl data\n");
return -EFAULT;
}
//
// get the time stamp
//
if(babel_debug>5) {
memset(buf,0,1024);
sprintf(buf,"seeking %03d.%03d.%03d.%03d:%u-%03d.%03d.%03d.%03d:%u packet %u",
((unsigned char *)&ioctlarg.saddr)[0],
((unsigned char *)&ioctlarg.saddr)[1],
((unsigned char *)&ioctlarg.saddr)[2],
((unsigned char *)&ioctlarg.saddr)[3],
ioctlarg.sport,
((unsigned char *)&ioctlarg.daddr)[0],
((unsigned char *)&ioctlarg.daddr)[1],
((unsigned char *)&ioctlarg.daddr)[2],
((unsigned char *)&ioctlarg.daddr)[3],
ioctlarg.dport,
ioctlarg.i
);
printk(KERN_WARNING "%s\n",buf);
for(i=0;i<MAX_BABEL_TS_NUM;i++) {
memset(buf,0,1024);
if(ts_list[i].status==BABEL_TS_FREE) continue;
sprintf(buf,"have %03d.%03d.%03d.%03d:%u-%03d.%03d.%03d.%03d:%u packet %u status %d",
((unsigned char *)&ioctlarg.saddr)[0],
((unsigned char *)&ioctlarg.saddr)[1],
((unsigned char *)&ioctlarg.saddr)[2],
((unsigned char *)&ioctlarg.saddr)[3],
ts_list[i].sport,
((unsigned char *)&ts_list[i].daddr)[0],
((unsigned char *)&ts_list[i].daddr)[1],
((unsigned char *)&ts_list[i].daddr)[2],
((unsigned char *)&ts_list[i].daddr)[3],
ts_list[i].dport,
ts_list[i].i,
ts_list[i].status
);
printk(KERN_WARNING "%s\n",buf);
}
}
//
// cmd==BABEL_READ_TS is a request to pick up a time stamp
//
if(ioctlarg.cmd==BABEL_READ_TS) {
for(i=0;i<MAX_BABEL_TS_NUM;i++) {
if(ts_list[i].saddr!=ioctlarg.saddr) continue;
if(ts_list[i].daddr!=ioctlarg.daddr) continue;
if(ts_list[i].sport!=ioctlarg.sport) continue;
if(ts_list[i].dport!=ioctlarg.dport) continue;
if(ts_list[i].i!=ioctlarg.i) {
printk(KERN_WARNING "found index %d\n",ts_list[i].i);
return -EAGAIN;
}
if(ts_list[i].status!=BABEL_TS_ROK) {
printk(KERN_WARNING "not ROK\n");
return -EAGAIN;
}
ts_list[i].status=BABEL_TS_WOK;
ioctlarg.ts=ts_list[i].ts;
if(copy_to_user(rq->ifr_data, &ioctlarg, sizeof(ioctlarg))) return -EFAULT;
return 0;
}
return -EAGAIN;
}
//
// cmd==BABEL_ADD_TS is a request to allocate space for a time stamp
//
else if(ioctlarg.cmd==BABEL_ADD_TS) {
do_gettimeofday(&tv);
```

APPENDIX 1-continued

```
for(i=0;i<MAX_BABEL_TS_NUM;i++) {
if(ts_list[i].status!=BABEL_TS_FREE && IS_ANCIENT(&tv,&ts_list[i].ts)) {
if(babel_debug>5) printk(KERN_WARNING "recycling slot %d\n",i);
ts_list[i].status=BABEL_TS_FREE;
}
}
//
// The following loop needs protection
//
spin_lock_irqsave(babel_lock, flags);
for(i=0;i<MAX_BABEL_TS_NUM;i++) {
if(ts_list[i].status==BABEL_TS_FREE) break;
}
spin_unlock_irqrestore(babel_lock, flags);
//
// there is no more space
//
if(i==MAX_BABEL_TS_NUM) {
printk(KERN_WARNING "no more space for stamps %03d.%03d.%03d.%03d::%u-%03d.%03d.%03d.%03d:%u\n",
((unsigned char *)&ioctlarg.saddr)[0],
((unsigned char *)&ioctlarg.saddr)[1],
((unsigned char *)&ioctlarg.saddr)[2],
((unsigned char *)&ioctlarg.saddr)[3],
ioctlarg.sport,
((unsigned char *)&ioctlarg.daddr)[0],
((unsigned char *)&ioctlarg.daddr)[1],
((unsigned char *)&ioctlarg.daddr)[2],
((unsigned char *)&ioctlarg.daddr)[3],
ioctlarg.dport
);
return -EAGAIN;
}
ts_list[i].saddr=ioctlarg.saddr;
ts_list[i].daddr=ioctlarg.daddr;
ts_list[i].sport=ioctlarg.sport;
ts_list[i].dport=ioctlarg.dport;
ts_list[i].status=BABEL_TS_WOK;
printk(KERN_WARNING "slot%d of%d is space for %03d.%03d.%03d.%03d:%u-%03d.%03d.%03d.%03d:%u\n",
i,MAX_BABEL_TS_NUM,
((unsigned char *)&ioctlarg.saddr)[0],
((unsigned char *)&ioctlarg.saddr)[1],
((unsigned char *)&ioctlarg.saddr)[2],
((unsigned char *)&ioctlarg.saddr)[3],
ioctlarg.sport,
((unsigned char *)&ioctlarg.daddr)[0],
((unsigned char *)&ioctlarg.daddr)[1],
((unsigned char *)&ioctlarg.daddr)[2],
((unsigned char *)&ioctlarg.daddr)[3],
ioctlarg.dport
);
return 0;
}
//
// cmd==BABEL_REMOVE_TS is a request to allocate space for a time stamp
//
else if(ioctlarg.cmd==BABEL_REMOVE_TS) {
do_gettimeofday(&tv);
for(i=0;i<MAX_BABEL_TS_NUM;i++) {
if(ts_list[i].status!=BABEL_TS_FREE && IS_ANCIENT(&tv,&ts_list[i].ts)) {
if(babel_debug>5) printk(KERN_WARNING "recycling slot %d\n",i);
ts_list[i].status=BABEL_TS_FREE;
}
}
for(i=0;i<MAX_BABEL_TS_NUM;i++) {
if(ts_list[i].saddr!=ioctlarg.saddr) continue;
if(ts_list[i].daddr!=ioctlarg.daddr) continue;
if(ts_list[i].sport!=ioctlarg.sport) continue;
if(ts_list[i].dport!=ioctlarg.dport) continue;
ts_list[i].status=BABEL_TS_FREE;
return 0;
}
return -EAGAIN;
}
else {
return EOPNOTSUPP;
}
}
```

APPENDIX 2

```
========================================================
=                                                      =
=                   controller                         =
=                                                      =
========================================================
call length L (in seconds) is selected by engineer
packet inter-packet delay DELTA (in microsecond) is selected by engineer
packet size S (in bytes) is selected by engineer
determine the number of packets N in one call: N=(1000000/DELTA)*L
for endpoint pair in endpoint pairs selected by system
    #
    # one call involves two endpoints, A and B
    #
    A=first endpoint in endpoint pair
    B=second endpoint in endpoint pair
    #
    # endpoint B is now configured for the call
    #
    1) ask B to prepare to echo N packets
    2) get the port number SP from B to be used for the call
    #
    # endpoint A is now configured for the call
    #
    1) ask A to prepare to send a stream of N packets of size S
       to endpoint B on port SP with inter-packet delay DELTA
    2) ask A to start the stream
    #
    # work is getting done so we sleep
    #
    sleep for L seconds
    #
    # the call should have completed by now so collect the data
    #
    ask A for the N packet timestamps
    ask B for the N packet timestamps
    #
    # process the timestamps into statistics
    #
    determine round trip delays for each of the N packets
    determine two (A to B and B to A) one-way delays for each of the
    N packets
    determine two (A to B and B to A) jitter values for each of the
    N packets
    determine two (A to B and B to A) loss values for each of the
    N packets
    #
    # reduce series to summary statistics
    #
    compute ave,sd,min,max of two (A to B and B to A) one-way delays
    compute ave,sd,min,max of two (A to B and B to A) jitter values
    compute ave,sd,min,max of two (A to B and B to A) loss values
    #
    # store the data in the database
    #
    store the summary statistics into the database
    store the packet timestamps data into the database
    #
    # clean up
    #
    ask A to release all resources related to the call
    ask B to release all resources related to the call
========================================================
=                                                      =
=                   endpoint (echo)                    =
=                                                      =
========================================================

# wait for the controller request and pick a port number

wait for the controller request
get the number of packets N in the call
determine our ip address SA
pick a free port number SP
send the controller the port number SP to be used for the call
allocate an N x 4 array to hold timestamps data
forever
    #
    # wait for one packet
    #
```

APPENDIX 2-continued

```
    wait for a packet to come on port SP
    #
    # get the packet data
    #
    determine the user land receive timestamp UR
    determine the kernel receive timestamp KR
    determine the source address DA of the packet
    determine the source port DP of the packet
    determine the index number I of the packet
    store UR, KR in memory array at index I
    #
    # request kernel timestamping services
    #
    if this is first packet
            ask kernel to keep send timestamp for UDP traffic from
            SA,SP
            to DA,DP
    #
    # get the kernel send timestamp for previous packet
    # this is done for the second packet onwards
    #
    if this is not first packet
            obtain the kernel send timestamp KS for previous packet
            store KS in memory array at index I-1
    #
    # send the packet back
    #
    determine the user land send timestamp US
    store US in memory array at index I
    send the packet back to sender SA
    #
    # break out of loop
    #
    if I equals N, break out of forever loop
    #
# get last kernel send timestamp

obtain the kernel send timestamp KS for previous packet
store KS in memory array at index N

# return the timestamp data when requested

wait for the controller to request the timestamp data
send the in memory array of size N x 4 of timestamp data

# clean up

wait for the controller to request the release of resources
free the N x 4 of timestamp data
========================================================
=                                                      =
=                   endpoint (rtp)                     =
=                                                      =
========================================================

# wait for the controller request

wait for the controller request
get the number of packets N in the call
get the inter-packet delay DELTA in the call
get the packet size S for the call
get the destination address DA for the call
get the destination port DP for the call
determine our ip address SA
pick a free port number SP
ask kernel to keep send timestamp for UDP traffic from SA,SP to DA,DP
allocate a N x 4 array to hold timestamps data

# set up alarms

set T0 to now
I=1
set up alarm for T0+I*DELTA
forever
    #
    # wait for something to happen (packet or alarm)
    #
    wait for a packet to come on port SP or alarm to ring
    #
```

APPENDIX 2-continued

```
# receiving

if packet has arrived
    #
    # get the packet data
    #
    determine the user land receive timestamp UR
    determine the kernel receive timestamp KR
    determine the index number J of the packet
    store UR, KR in memory array at index J
    #
    # break out of loop
    #
    if J equals N, break out of forever loop

# sending

if alarm has rung
    #
    # store timestamps
    #
    #
    # get the kernel send timestamp for previous packet
    # this is done for the second packet onwards
    #
    if this is not first packet
        obtain the kernel send timestamp KS for previous packet
        store KS in memory array at index I-1
    #
    # prepare the packet to be send
    #
    build an RTP packet with header and index I
    determine the user land send timestamp US
    store US in memory array at index I
    I=I+1
    setup alarm to ring at T0+I*DELTA

# get last kernel send timestamp

obtain the kernel send timestamp KS for previous packet
store KS in memory array at index N

# return the timestamp data when requested

wait for the controller to request the timestamp data
send the in memory array of size N x 4 of timestamp data

# clean up

wait for the controller to request the release of resources
free the N x 4 of timestamp data
```

What is claimed is:

1. An apparatus for use in a network-based communication system, the apparatus comprising:

an endpoint device having an integrated call synthesis capability, the endpoint device comprising a processor coupled to a memory, the endpoint device being operative in at least a first mode of operation in which the device responds to one or more commands from a testing server of the system directing the device to participate in a test communication within the system, and a second mode of operation in which the device is utilizable by a system user to establish communication between the device and another endpoint device of the system.

2. The apparatus of claim 1 wherein the endpoint device comprises an Internet Protocol (IP) telephone.

3. The apparatus of claim 1 wherein the endpoint device comprises a personal digital assistant (PDA).

4. The apparatus of claim 1 wherein the endpoint device comprises a computer.

5. The apparatus of claim 1 wherein the endpoint device communicates with the testing server over a network of the system.

6. The apparatus of claim 1 wherein the endpoint device receives the one or more commands from the testing server through a connection established utilizing at least one of a Transmission Control Protocol (TCP), a User Datagram Protocol (UDP) and a Simple Network Management Protocol (SNMP).

7. The apparatus of claim 1 wherein the endpoint device is configured such that the integrated call synthesis capability thereof is discoverable by the testing server determining if the endpoint device accepts connections at a specified port number.

8. The apparatus of claim 1 wherein the one or more commands from the testing server specify a destination endpoint device to which the test communication should be directed.

9. The apparatus of claim 1 wherein the one or more commands from the testing server specify a packet size for the test communication.

10. The apparatus of claim 1 wherein the one or more commands from the testing server specify a frequency with which packets will be sent in the test communication.

11. The apparatus of claim 1 wherein the one or more commands from the testing server specify a length of the test communication.

12. The apparatus of claim 1 wherein the one or more commands from the testing server specify a rest period duration between consecutive test communications.

13. The apparatus of claim 1 wherein the one or more commands from the testing server specify the number of test communications to be generated substantially concurrently by the endpoint device.

14. The apparatus of claim 1 wherein the test communication comprises Real-Time Transport Protocol (RTP) data packets encapsulated within User Datagram Protocol (UDP) packets and transmitted within Internet Protocol (IP) packets.

15. The apparatus of claim 1 wherein the test communication is sent from a first endpoint device to a second endpoint device, and returned from the second endpoint device back to the first endpoint device.

16. The apparatus of claim 15 wherein the first and second endpoint devices each record timestamp information associated with sending and receiving of the test communication, and subsequently report the timestamp information back to the testing server.

17. The apparatus of claim 16 wherein each of the first and second endpoint devices is configured to record the timestamp information associated with sending and receiving of the test communication at points in time corresponding substantially to times of respective transmission and reception of the test communication over a connection associated with a network of the system under the control of an operating system kernels of the endpoint device.

18. The apparatus of claim 16 wherein the timestamp information is subject to a post-processing operation which determines an appropriate separation of a round trip time measurement into a pair of one-way measurements without requiring synchronization of clocks associated with the first and second endpoint devices.

19. The apparatus of claim 18 wherein the post-processing operation involves determining a record time from a plurality of times associated with different packets of the test communication.

20. The apparatus of claim 1 wherein the endpoint device records measurement information associated with the test communication and subsequently reports the measurement information back to the testing server.

21. A method for use in a network-based communication system comprising a plurality of endpoint devices and a testing server, one or more of the endpoint devices each having an integrated call synthesis capability, the method comprising the steps of:

identifying particular ones of the endpoint devices having the integrated call synthesis capability; and sending one or more commands from the testing server to a given one of the identified endpoint devices, the one or more commands directing the given endpoint device to participate in a test communication within the system utilizing its integrated call synthesis capability.

22. An apparatus for use in a network-based communication system comprising a plurality of endpoint devices, one or more of the endpoint devices each having an integrated call synthesis capability, the apparatus comprising:

a testing server connectable to each of the plurality of endpoint devices over a network of the system, wherein the testing server transmits one or more commands to each of at least a pair of the endpoint devices having the integrated call synthesis capability, directing the pair of devices to participate in a test communication within the system utilizing their integrated call synthesis capability.

23. An apparatus for use in a network-based communication system, the apparatus comprising:

an endpoint device having an integrated call synthesis capability, the endpoint device comprising a processor coupled to a memory, the endpoint device being operative in at least a first mode of operation in which the device responds to one or more commands from a testing server of the system directing the device to participate in a test communication within the system, wherein the endpoint device is configured to record timestamp information associated with sending and receiving of the test communication at points in time corresponding substantially to times of respective transmission and reception of the test communication over a connection associated with a network of the system under the control of an operating system kernel of the endpoint device.

24. An apparatus for use in a network-based communication system, the apparatus comprising:

an endpoint device having an integrated call synthesis capability, the endpoint device comprising a processor coupled to a memory, the endpoint device being operative in at least a first mode of operation in which the device responds to one or more commands from a testing server of the system directing the device to participate in a test communication within the system, wherein the endpoint device is configured to record timestamp information associated with sending and receiving of the test communication, and wherein the timestamp information is subject to a post-processing operation which determines an appropriate separation of a round trip time measurement into a pair of one-way measurements without requiring clock synchronization between the endpoint device and another endpoint device of the system.

* * * * *